F. GONZALEZ.
DENTAL TOOL.
APPLICATION FILED MAY 1, 1920.

1,356,352.

Patented Oct. 19, 1920.

WITNESSES

INVENTOR
F. GONZALEZ
BY
ATTORNEYS

UNITED STATES PATENT OFFICE.

FELICIANO GONZALEZ, OF NEW YORK, N. Y.

DENTAL TOOL.

1,356,352.  Specification of Letters Patent.  Patented Oct. 19, 1920.

Application filed May 1, 1920. Serial No. 378,215.

*To all whom it may concern:*

Be it known that I, FELICIANO GONZALEZ, a citizen of the United States, and resident of the city of New York, borough of Manhattan, county and State of New York, have invented a new and Improved Dental Tool, of which the following is a full, clear, and exact description.

In connection with dental work, it is well understood that it is often desirable to utilize the drilling machine for fine operations which necessitate very slow drilling.

With this in view numerous drilling machines have been placed on the market having a rheostat connected with the motor by means of which the speed of the latter may be varied.

Often, with a reduction of motor speed to a minimum, it is well understood that the rotation of the drill has been entirely too mechanical, not being conducive to working with that degree of nicety and skill which is most desirable.

With this in view hand drills have been utilized, which permit an extremely slow rotation of the drill bit and a clockwise or anti-clockwise motion thereof. In this latter type of instrument, it has been necessary to have one instrument for each type of drill, and it will be appreciated that this alone involves a considerable item of expense, irrespective of the fact that a great amount of tools must always be kept on hand, and that hand drills, by virtue of the long shank, are incapable of reaching certain affected portions of the gums and teeth with that degree of ease afforded by means of the chuck end of the motor driven drill.

With this in mind, I have constructed a dental tool, the main part of which is formed by the chuck end of the conventional motor driven drill, it being uncoupled from this instrument when it is to be used for extremely delicate operations, and associated with a certain type of improved tool forming the subject matter of my invention.

Reference is had to the attached sheet of drawings as illustrating a practical embodiment of my invention, and in which drawings, Figure 1 is a partly sectional side view of a chuck end of a motor driven drill having associated with it my improved tool.

Figure 1:
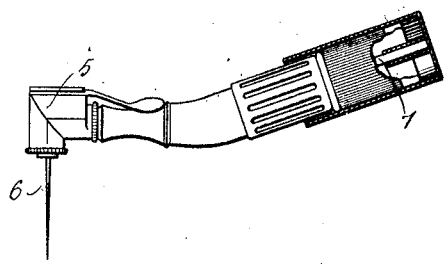

In these views the reference numeral 5 designates the chuck of a dental tool, which may be of any desired type, and which, in the usual manner is capable of removably receiving any number of different sized drills 6, the chuck being detachable in the usual manner from the drill, and being provided with the conventional operating stem 7.

Figure 2:
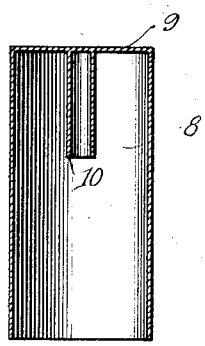
Fig. 2 is an enlarged sectional side view of the tool.
Figure 3:
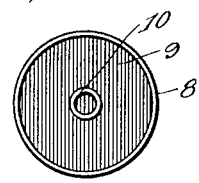
Fig. 3 is an open end view thereof.

Now with a view of providing means which will serve to rotate the stem 7, and which means forms the subject matter of my invention, I construct the cap, conveniently shown in Fig. 2 which comprises a cylindrical portion 8 of sufficient diameter to be capable of overlapping the stem of the chuck, one end of which cylindrical portion 8 is conveniently closed, as at 9, and provided with an inwardly extending hollow stem 10 of sufficiently constricted diameter to insure a firm embracing and engagement of the operating stem 7 when the cap is applied to the chuck in the manner shown in Fig. 1.

It will now be appreciated, assuming that the dentist has accomplished the rough drilling by means of the motor driven machine, that the chuck may be uncoupled, and a suitable drill bit inserted in the same, the cap being slipped around the shank of the chuck to a point at which a firm engagement between the hollow stem 10 and operating stem 7 is insured.

With the parts in this position, it will readily be appreciated that the chuck may be held in the fingers of one hand, and that the cap may be rotated by the thumb of the same hand, or by the fingers of the opposite hand if it is so desired.

It will further be appreciated, by the construction adapted, that a fine degree of work may be accomplished, and that the structure of the cap member may be varied to conform to the various uses to which it is to be subjected without departing from the scope of my claims, which read.

What I claim as new is;—

1. A dental tool, including in combination with the conventional chuck of a mechanically driven drill and operating stem of said chuck, of means adapted to be removably associated with said chuck for manually operating said stem.

2. A dental tool, including in combination with the conventional chuck of a mechanically driven tool, and operating stem of said chuck, of means adapted to be removably associated with said chuck, and to engage the operating stem for permitting a manual rotation of the latter.

3. A dental tool including in combination with the conventional chuck and operating stem therefor, of a cap formed with a hollow stem, said hollow stem being adapted to receive the end of said operating stem whereby upon the cap being rotated, to manually rotate the operating stem.

4. A dental tool including in combination with the conventional chuck and operating stem therefor, of a cap including a cylindrical portion, a closed end portion, and a hollow stem associated with said closed end portion, said cylindrical portion being adapted to embrace the end of said chuck, said hollow stem engaging said operating stem whereby upon the cap being rotated, a manual rotation of the operating stem will result.

FELICIANO GONZALEZ.